Patented Apr. 1, 1930

1,753,120

UNITED STATES PATENT OFFICE

HANS KÄMMERER, OF MANNHEIM, GERMANY, ASSIGNOR TO GENERAL ANILINE WORKS, INC., OF NEW YORK, N. Y., A CORPORATION OF DELAWARE

DYESTUFFS CONTAINING CHROMIUM

No Drawing. Application filed April 13, 1928, Serial No. 269,875, and in Germany May 14, 1927.

This invention relates to the production of new dyestuffs containing chromium.

It has already been suggested to produce chromiferous pyrazolone dyestuffs by treating o-hydroxyazodyestuffs of the pyrazolone series, containing an $-SO_2NH_2$ group in the aryl nucleus of the arylpyrazolone body with agents supplying chromium.

I have now found that chromiferous dyestuffs with similar properties are obtained if the dyestuffs obtainable by coupling diazotized o-amino-naphthols, or their derivatives with sulfo-aryl-methyl-pyrazolones containing sulfonic groups instead of the amides thereof are treaded with agents supplying chromium. It results that the valuable properties of the dyestuffs mentioned above do not depend as was hitherto supposed, on the presence of a sulfamido group. The process according to this invention constitutes an important improvement, inasmuch as the sulfamino-arylmethylpyrazolones are difficult and troublesome to produce. The dyestuffs obtained according to this invention are distinguished by being fast to milling and produce even dyeings.

The following examples will further illustrate the nature of my invention which however is not limited thereto. The parts are by weight.

Example 1

500 parts of the azo dyestuffs obtainable by coupling the diazo compound of 1-amino-2-naphthol-4-sulfonic acid with 1-(3'-sulfo)-phenyl-3-methyl-5-pyrazolone are heated at 120° centigrade for 3 hours in an autoclave with 1400 parts of water, 500 parts of 27.5 per cent of chromic acid and 250 parts of 85 per cent formic acid. The resulting dyestuff solution is then salted out or evaporated to dryness. The product gives excellently even pink dyeings on wool, which are very fast to washing and milling.

Example 2

250 parts of the dyestuff obtainable by coupling the diazo-compound of nitrated 1-amino-2-naphthol-4-sulfonic acid with 1-(4'-sulfo)-phenyl-3-methyl-5-pyrazolone are heated to 120° centigrade for 3 hours in a closed vessel with 650 parts of a chromium formate solution containing 68 parts of chromium hydroxide, the solution being then salted out or evaporated. The resulting dyestuff gives yellowish-red even dyeings on wool, very fast to washing and milling.

The chromiferous dyestuffs may also be prepared in any other convenient manner by treating the initial materials with any other suitable chromium compound, also for example by longer boiling under ordinary pressure.

Example 3

250 parts of the azo dyestuff obtainable by coupling the diazo compound of nitrated 1-amino-2-naphthol-4-sulfonic acid with 1-(3'-sulfo)-phenyl-3-methyl-5-pyrazolone are heated for 3 hours in an autoclave with 650 parts of a chromium formate solution containing 68 parts of chromium hydroxide to 120° centigrade. The dyestuff thus obtained is salted out and dried. It dyes wool in well equalized yellowish-red shades, which are very fast to washing, milling and light.

What I claim is:

1. As new articles of manufacture, chromiferous dyestuffs fast to washing, milling and light, which are the chromium compounds of the azo-dyestuffs from diazotized o-amino-naphthols and sulfo-phenyl-methyl-pyrazolones.

2. As new articles of manufacture, chromiferous dyestuffs fast to washing, milling and light, which are the chromium compounds of the azo-dyestuffs from diazotized 1-amino-2-naphthol-4-sulfonic acid and sulfo-phenyl-methyl-pyrazolones.

3. As a new article of manufacture, the chromiferous dyestuffs fast to washing, milling and light, which is the chromium compound of the azo-dyestuffs from diazotized 1-amino-2-naphthol-4-sulfonic acid with 1-(3'-sulfo)-phenyl-3-methyl-5-pyrazolone.

In testimony whereof I have hereunto set my hand.

HANS KÄMMERER.